Patented Feb. 3, 1931

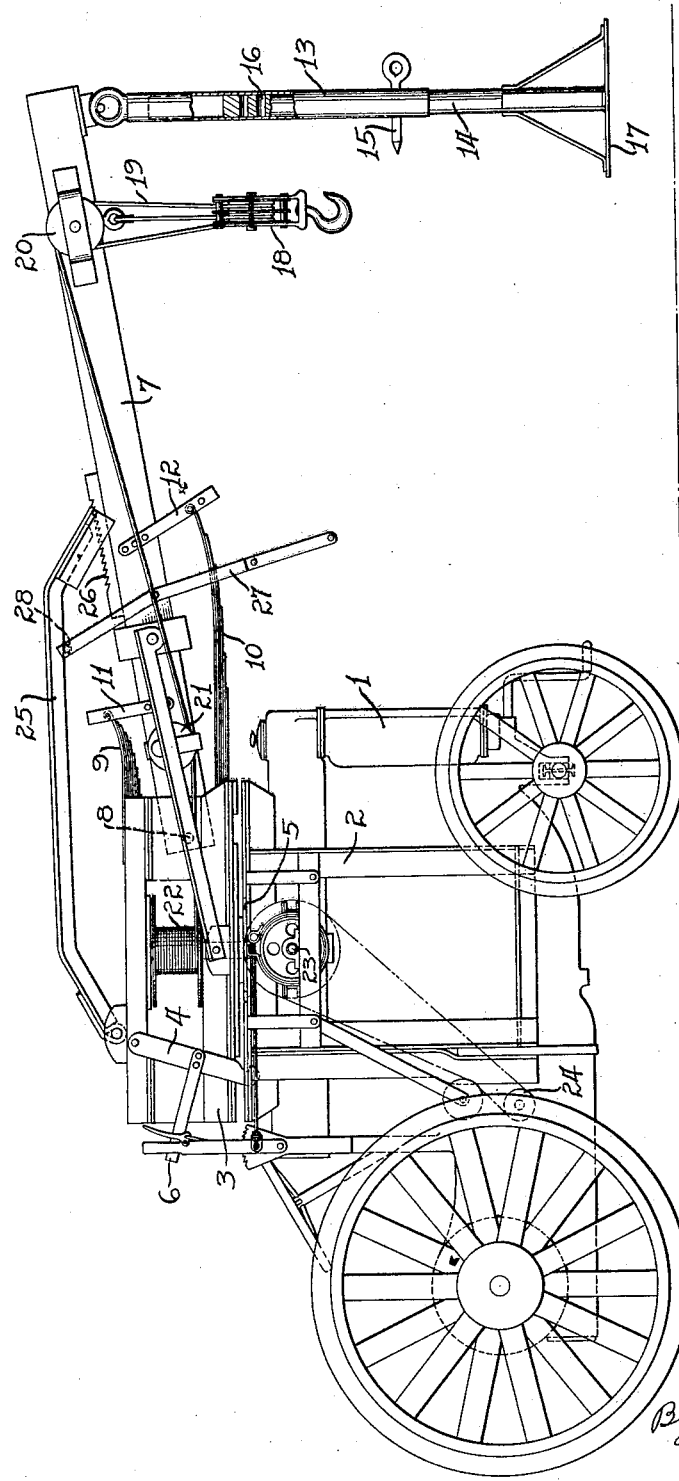

1,790,692

UNITED STATES PATENT OFFICE

EARL E. ALLEN, OF SHREVEPORT, LOUISIANA, ASSIGNOR TO THE BUCKEYE TRACTION DITCHER CO., OF FINDLAY, OHIO, A CORPORATION OF OHIO

CRANE

Application filed June 13, 1929. Serial No. 370,496.

This invention relates to a crane, and more especially to one which is adapted to be mounted on a tractor and operated by the motor thereof.

One of the objects of the invention is to provide means for supporting the outer end of the boom directly from the ground, thereby overcoming the tendency, whenever a heavy load is carried by the boom, to cause tilting of the tractor or any other base on which the boom is supported. Such means, in the present embodiment of the invention, includes a stiff arm pivotally connected to the end of the boom and adjustable in length to adapt it to various conditions under which it may be used. The boom itself is preferably mounted so that it may be adjusted about a vertical axis to accommodate it to the relative position of the load to be picked up.

The invention consists further in various details of construction and combinations of elements, the nature and purpose of which will be more particularly explained in connection with the accompanying drawing, which illustrates one embodiment thereof.

In the drawing, the single figure represents a side elevation of a tractor with the invention mounted thereon.

In mounting the invention on a tractor 1, a frame 2 is secured to the body of the tractor, and on this frame a turntable 3 is supported for adjustment about a vertical axis. The turntable may be secured in adjusted position by means of a dog 4, which is pivoted to the turntable and is adapted to engage any one of a number of notches 5 formed in the periphery of the upper part of the frame 2. When it is desired to adjust the turntable to a different position, the dog 4 may be manually disengaged from the notch by means of an outwardly projecting handle 6. The turntable may be rotated to the desired position either manually or by other means.

The boom 7 is pivoted to the turntable 3, as indicated at 8, and is urged upwardly by springs 9 and 10, which are secured to the turntable and are connected to the boom by links 11 and 12 respectively. These springs are of sufficient strength to support the boom clear of the ground when there is no load carried thereby.

A stiff arm 13 is pivotally connected to the outer end of the boom 7 and preferably includes a telescoping extension 14, which may be adjusted lengthwise and locked in its adjusted position by means of a pin 15 engageable in any one of a series of holes 16. A ground engaging foot 17 is secured to the lower end of the extension 14 and is adapted to rest upon the ground to support the outer end of the boom 7, whenever a load is carried thereby.

Suitable tackle 18 is carried by the outer end of the boom 7 and is operated through the medium of a cable 19 which passes over a sheave 20 mounted on the outer end of the boom and thence underneath a sheave 21 mounted near the inner end of the boom and is adapted to be wound upon a windlass 22, which is rotatable about the axis of the turntable 3. The windlass 22 is rotated through the medium of a counter shaft 23 which is adapted to be driven from a pulley 24 of the usual type connected with the motor of the tractor.

Whenever the tackle 18 is connected to a load and the windlass 22 is driven to wind up the cable, the boom 7 is first drawn downwardly against the resistance of the springs 9 and 10, until the foot 17 engages the ground. The load may then be lifted without creating any tendency for the tractor to tilt. A latch bar 25 is pivotally mounted on the turntable 3 and is adapted to rest by gravity on a ratchet 26 secured to the upper face of the boom 7. Thus the latch 25 will automatically ride over and engage successive teeth of the ratchet 26 and will prevent any rebound of the boom 7, when the load is released, until the latch is disengaged. As a convenient means of disengaging the latch 25, a hand lever 27 is pivoted to the boom 7, and the upper end of this lever is provided with a roller 28 adapted to engage the latch 25. Whenever it is desired to move the tractor to some other position or to shift the position of the boom 7, the lever 27 may be actuated to lift the latch 25 and permit the boom 7 to rise under the influence of the springs 9 and 10 and to lift the member 17 from the ground.

From the foregoing description, it will be understood that the boom 7 and stiff arm 13 are normally carried in raised position. The boom with the turntable may be adjusted about a vertical axis, so that a load may be picked up from any side of the tractor. The length of the stiff arm 13 may be adjusted to accommodate it to the contour of the ground upon which the foot 17 rests. This length is so determined that the foot 17 will be just above the ground when the boom 7 is in its uppermost position. As soon as the load is picked up, the springs 9 and 10 will yield sufficiently for the foot 17 to engage the ground firmly and thus support the load without tilting the tractor.

The entire crane and its supporting frame may be very easily attached to the tractor, to be supported thereby, without any modification of the tractor. It is to be observed, however, that the crane may also be attached to any other suitable support, either portable or fixed. It will also be understood that the structure of the invention may be modified in many respects without departing materially from the scope thereof as defined in the claims.

What I claim is:

1. In a crane, the combination of a base, a boom pivotally mounted on the base, yieldable means normally supporting the boom in its uppermost position, a power line connected with the boom, said yieldable means permitting the boom to be lowered when a load is picked up, and independent means for engaging the ground and supporting the outer end of the boom when it is thus lowered.

2. In a crane, the combination of a base, a boom pivotally mounted on the base, an auxiliary support depending from the end of the boom, and means associated with the base for normally supporting the boom independently of said auxiliary support, said means being yieldable under the influence of a load on the boom to permit the auxiliary support to engage the ground and thereby support the end of the boom with its load.

3. In a crane, the combination of a base, a boom pivotally mounted on the base, a stiff arm depending from the end of the boom, means associated with the base for normally supporting the boom with the stiff arm free from the ground, said means being yieldable under the influence of a load on the boom to permit said stiff arm to engage the ground and thereby support the end of the boom, and latching means for holding the boom with the stiff arm in engagement with the ground, after the boom is unloaded, until such latching means is released.

4. In a crane, the combination of a base, a boom pivotally mounted on the base, a stiff arm depending from the end of the boom, and means associated with the base for normally supporting the boom with the stiff arm free from the ground, said means being yieldable under the influence of a load on the boom to permit the stiff arm to engage the ground and thereby support the end of the boom, said stiff arm being adjustable in length to accommodate it to the contour of the ground.

5. In a crane, the combination of a base, a boom pivotally mounted on the base, a stiff arm depending from the end of the boom, means connected with the base for supporting the end of the boom with the stiff arm free from the ground when the boom is not loaded, said means being yieldable under the influence of the load imposed upon the boom to permit said stiff arm to engage the ground and thereby support the outer end of the boom and its load, means for automatically latching the boom with the stiff arm in engagement with the ground, after the boom is unloaded, until such latching means is released, said stiff arm being adjustable in length to correspond to the level of the ground therebeneath.

6. In a crane, the combination of a base, a boom pivotally mounted on the base, a stiff arm connected with the outer end of the boom for engaging the ground to support said outer end when a load is carried by the boom, means for automatically latching the boom in its lowermost position, a manually operable lever to free such latching means, and resilient means for raising the boom when the latter has been relieved of its load and unlatched.

7. In a crane, the combination of a base rotatably adjustable about a vertical axis, means for latching said base in adjusted position, a boom pivotally mounted on the base, a stiff arm depending from the end of the boom, and means normally supporting the end of the boom with the stiff arm free from the ground, said means being yieldable under the influence of a load on the boom to permit said stiff arm to engage the ground and thereby support the outer end of the boom with its load.

8. In a crane, the combination of a base, a boom carried thereby, a power line connected with the boom, a stiff arm connected with the end of the boom and engageable with the ground when the power line is operated, and releasable latching means for holding the boom in its lowered position with the stiff arm engaging the ground.

9. In a crane, the combination of a base, a boom pivotally mounted on the base and normally supported entirely thereby, a power line connected with the boom, means for independently supporting the outer end of the boom when it is lowered and when a load is picked up, and releasable means for locking the boom in lowered position.

In testimony whereof I have hereunto signed my name to this specification.

EARL E. ALLEN.